United States Patent [19]

Moreau

[11] Patent Number: 5,096,656
[45] Date of Patent: Mar. 17, 1992

[54] PROCESS FOR MONITORING THE SIDE WALLS OF A STORAGE CELL FOR A FUEL ASSEMBLY

[75] Inventor: Bernard Moreau, les Clayes Sous Bois, France

[73] Assignee: Framatome, Courbevoie, France

[21] Appl. No.: 362,130

[22] Filed: Jun. 6, 1989

[51] Int. Cl.$^5$ .............................................. G21C 17/00
[52] U.S. Cl. .................................... 376/245; 376/272
[58] Field of Search ............... 376/245, 250, 252, 272

[56] References Cited

U.S. PATENT DOCUMENTS

| | | | |
|---|---|---|---|
| 3,898,741 | 8/1975 | Casey | 33/178 F |
| 4,172,492 | 10/1979 | Abell et al. | 165/11 |
| 4,172,760 | 10/1979 | Ballard et al. | 176/19 R |
| 4,425,296 | 1/1984 | Adamowski et al. | 376/245 |
| 4,443,402 | 4/1984 | Marini et al. | 376/252 |

FOREIGN PATENT DOCUMENTS 2011004 7/1979 United Kingdom .

*Primary Examiner*—Brooks H. Hunt
*Assistant Examiner*—Chrisman D. Carroll
*Attorney, Agent, or Firm*—Pollock, Vande Sande & Priddy

[57] ABSTRACT

A detection unit (20) is moved under water inside the fuel storage pond (15), over the entire height and in the vicinity of a wall of the cell (2). The detection unit (20) comprises at least one probe for monitoring the thickness of the material. The probe readings are collected from a region (22) situated above the pond (15) and these readings are compared with reference measurements. The monitoring process makes it possible to verify the presence of the neutron-absorbing material in the side walls (10) of the cell (2).

4 Claims, 5 Drawing Sheets

PROCESS FOR MONITORING THE SIDE WALLS OF A STORAGE CELL FOR A FUEL ASSEMBLY

FIELD OF THE INVENTION

The invention relates to a process and a device for monitoring the side walls of a storage cell for a fuel assembly.

BACKGROUND OF THE INVENTION

In nuclear reactors, particularly in pressurized water nuclear reactors, the storage of the irradiated fuel assemblies withdrawn from the reactor core takes place in a storage and cooling pond arranged near the reactor building.

The irradiated fuel assemblies are immersed in the pond water and are submerged under a sufficient depth of water to provide biological protection of the regions situated in the vicinity of the storage pond.

In order to facilitate the storage of the fuel assemblies and to increase the capacity of the storage ponds, the fuel assemblies taken out of the reactor core are arranged in casings or cells defining a housing whose shape corresponds to the shape of the fuel assembly and which are arranged according to a uniform pattern to form a storage rack for fuel assemblies. The walls of the various casings or cells forming a storage rack are placed parallel to one another and slightly apart, so as to decrease the volume of the storage rack and hence to increase the storage capacity of the pond, while retaining the possibility of cooling the storage assemblies by means of sheets of water in contact with the cell walls.

To limit the activity and the heating of the stored fuel assemblies while retaining a small separation between the cells, the walls of the cells are partially made of a material having a high neutron-absorption capacity. The neutron-absorbing products or neutron absorbers most frequently used are boron carbide and cadmium. These neutron absorbers are generallly in the form of a layer arranged between two stainless steel walls forming the inner and outer faces of the cell wall.

In this way, the neutron absorber does not come into contact with the pond water inasmuch as the stainless steel walls surrounding this material are fastened to one another at their ends, so as to form a leakproof enclosure. These walls, which protect the neutron absorber against mechanical impacts which can occur in the course of handling operations are therefore also responsible for protecting this material against corrosion.

The cells are made and constructed with great care, so as to endow the jacket enclosing the neutron absorber and forming the wall of these cells with the best possible leakproofing. However, this leakproofing cannot be guaranteed during extended periods of use when the cells are continuously immersed in the water of the cooling pond. Furthermore, it is possible for certain parts of the walls of the cells to become damaged and to lose their leakproofing in the course of the handling operations on the cells themselves or on the nuclear fuel.

In this case, the pond water comes into contact with the neutron absorber and may cause more or less extensive damage to the neutron absorption layer in the cell wall. This may result locally in an activation and abnormal heating of the fuel assemblies. The fuel assemblies must remain in the storage pond for a time sufficient to reduce the residual activity of the assemblies sufficiently to allow these assemblies to be transported to the reprocessing or definitive storage sites. After a residence time in the pond water which may be of long duration, there is a risk that the storage cell no longer provides the safety guarantees resulting from the presence of continuous neutron-absorbent walls surrounding the fuel cells.

In the case where abnormal behavior of a storage rack is detected, it may be necessary to perform a complete change of such storage rack after unloading the fuel assemblies. To avoid such a complex operation, provision is generally made for racks comprising individually removable cells which can be replaced in the storage rack which remains in place in the cooling pond.

However, there has so far been no known process or device making it possible to monitor or supervise the state of the absorbent walls of the fuel assembly storage cells in a cooling pond.

SUMMARY OF THE INVENTION

It is an object of the invention to provide a process for monitoring the side walls of a storage cell for a fuel assembly immersed in a pond for underwater storage of fuel assemblies and comprising vertical side walls enclosing a neutron-absorbent material, this process making it possible to determine very quickly and with a high degree of certainty the state of the neutron-absorbent material in the wall of the cell.

To this end, at least one probe for monitoring the thickness of a material is moved underwater, in the vertical direction, over the entire height of the cell, in the vicinity of at least one wall which is being monitored, the readings of the probe are collected from a region situated above the storage pond, and these readings are compared with reference measurements.

The invention also relates to a monitoring device comprising at least one Foucault current probe, remotely-controlled means for moving this probe under water in the vertical direction, and means for collecting the probe signal.

BRIEF DESCRIPTION OF THE DRAWINGS

In order that the invention may be more clearly understood a description will now be given, by way of example with reference to the attached drawings, of several embodiments of a monitoring device according to the invention and of its use in the case of storage cells for the fuel assemblies of a light-water nuclear reactor.

DESCRIPTION OF PREFERRED EMBODIMENT

Figure 1:
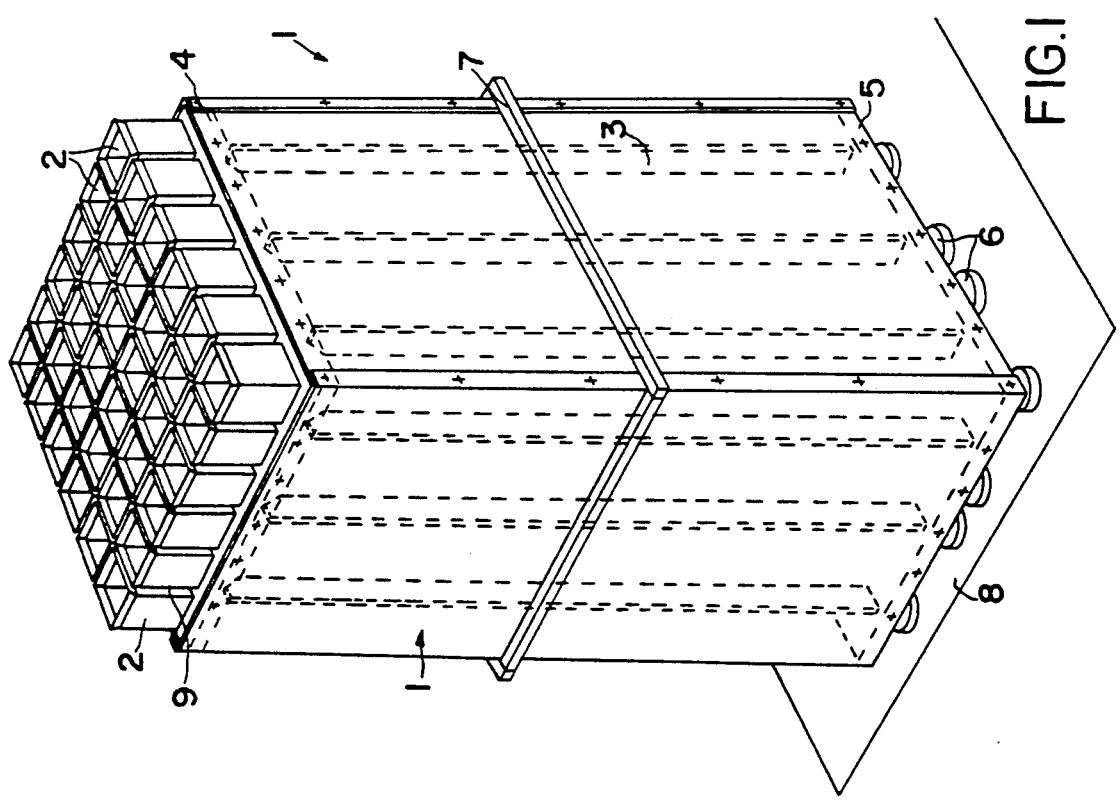
FIG. 1 is a perspective view of a storage rack for the fuel assemblies of a light-water nuclear reactor, in working position in the storage pond of the reactor.

FIG. 1 shows a storage rack or grid 1, of square cross-section and consisting of thirty-six cells 2.

The rack 1 comprises a framework consisting of a peripheral metal sheet 3, an upper plate 4 and a lower plate 5, made of stainless steel and assembled by welding. The framework of the storage rack 1 also comprises a reinforcing strap 7 and feet 6 resting in operation on the bottom 8 of the fuel storage pond of a nuclear reactor.

The upper plate 4 defines a network of square-pitched housings into which the cells 2 are inserted. When the cells 2 are in position in the rack 1, interstices 9 exist between the walls of the cells, over the entire height of these cells, to permit the passage of a sheet of cooling water between the cells intended to receive the irradiated fuel assemblies.

The cells 2 are removable inside the rack 1 and can be withdrawn and replaced by using the handling means of the storage pond of the reactor.

Figure 2:
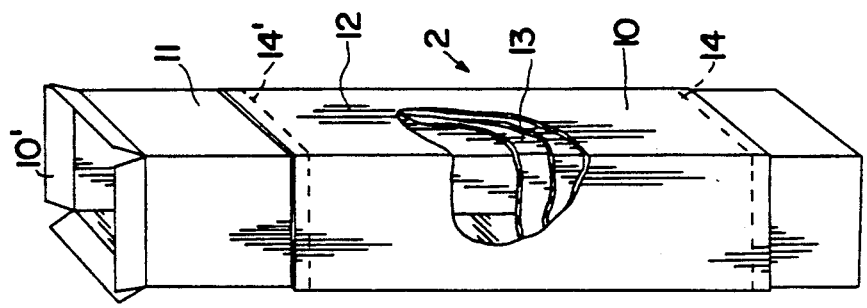
FIG. 2 is a perspective view, partly in section, of a storage cell of the rack shown in FIG. 1.

FIG. 2 shows a cell 2 of square-sectioned parallelepipedal shape comprising four side walls 10 widened out in their upper part 10' to facilitate the entry of the fuel assemblies placed in the storage pond.

In the case of the light-water nuclear reactors of current construction, the fuel assemblies have a square section with a side of approximately 20 cm and are 4 m in height. The storage cells for these fuel assemblies have corresponding dimensions and have a metal wall consisting of a stainless steel sheet whose thickness is of the order of 1 to 4 mm, depending on the design of the wall which must ensure sufficient rigidity of the cell to maintain perfectly determined and perfectly uniform spacings 9 between the walls of neighboring cells.

The side walls 10 of the cell 2 comprise an inner enclosure made of stainless steel sheet 11, an outer enclosure 12, also made of stainless steel, surrounding the inner enclosure 11 except at its ends and a layer of absorbent material 13 inserted between the inner enclosure 11 and the outer enclosure 12.

The layer of absorbent material 13 may consist of a sheet of cadmium of sufficient thickness to ensure effective absorption of the neutrons emitted by the irradiated fuel assembly inserted into the cell 2, inside the storage pond.

The outer enclosure 12 is welded onto the inner enclosure 11 along two continuous welding lines 14 and 14', so that the layer 13 of cadmium is completely isolated from the external medium which consists of the water of the storage pond when the cell is in use.

After manufacture, the cell 2 is carefully monitored to verify whether the absorbent layer 13 is perfectly continuous throughout the cell height, and in particular to verify that there has been no local tearing of the cadmium sheet during the coating onto the inner wall, with the exception of its ends which are not covered by the enclosure 12.

The cells introduced into the storage racks 1 in the storage pond are therefore equipped with perfectly absorbent walls which are continuous and whose neutron absorption capacity is uniform throughout their height.

The enclosures 11 and 12 of the cell make it possible, furthermore, to protect the absorbent layer 13, both when the cell is being handled and during the handling of the fuel assemblies.

However, some loss of leakproofing of the jacket 11, 12 can occur accidentally. The layer 13 of cadmium then comes into contact with the water of the storage pond, which is capable of producing a deterioration or at least localized destruction of the absorbent layer.

Monitoring of the walls of the cells of the storage racks must therefore be carried out at regular intervals inside the pond.

Figure 3:
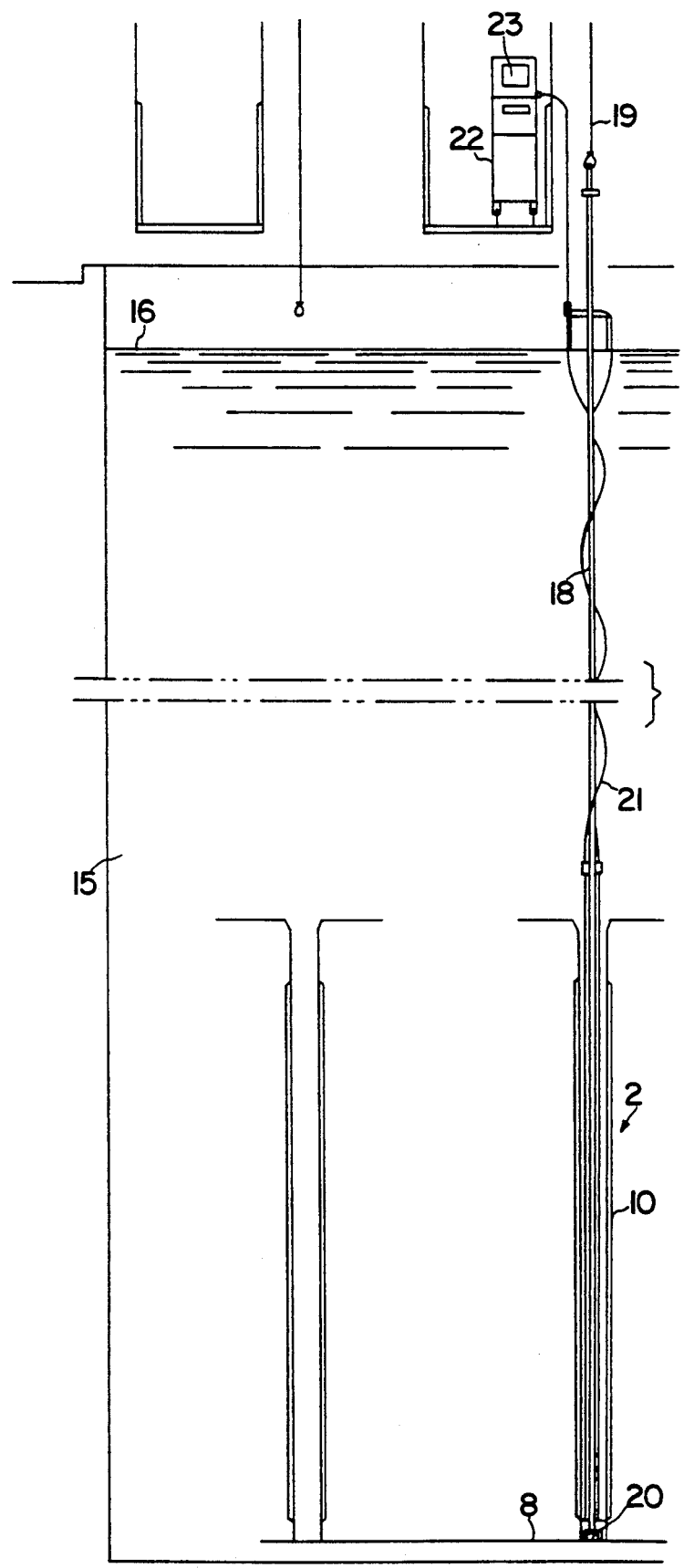
FIG. 3 is a partially sectioned elevation view of a monitoring device permitting the use of the process according to the invention in the storage pond of a nuclear reactor.

FIG. 3 shows a device permitting the use of the monitoring process of the invention with the aim of verifying the integrity of the walls of the storage cells.

The device is shown in working position inside a cell 2 arranged in a storage rack resting on the bottom 8 of a fuel storage pond 15 of a light-water nuclear reactor.

The storage racks are arranged under water, the upper level 16 of the storage pond being situated at a vertical distance of the order of 10 m above the upper part of the storage racks.

The device according to the invention comprises a vertical rod 18 of great length, possibly of the order of 15 m, suspended at one of its ends from a lifting cable 19 and carrying, at its other end, a detection unit 20 comprising Foucault current thickness probes, to be described hereinbelow.

The detection unit 20 is connected by means of cables 21 to a monitoring station 22 situated above the filling level 16 of the pond and serving to feed the measurement probes and to collect the signals originating from these probes. A display screen 23 permits the signals and the state of the walls being monitored to be displayed.

The lifting cable 19 is connected to a lifting apparatus with which the storage pond is equipped and makes it possible to move the detection unit 20 in the vertical direction in the vicinity of the walls 10 of the cell 2.

Figure 4:
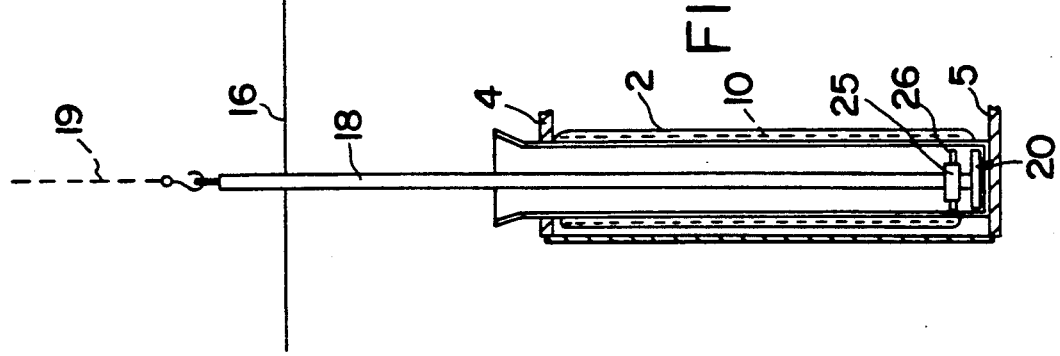
FIG. 4 is a sectional view of a storage cell and of a part of the monitoring device comprising Foucault current probes in working position in the cell.

FIG. 4 shows that the detection unit 20 comprises a system of Foucault current probes 25 comprising sensitive elements 26 in radial direction, whose end is kept in contact with the inner surface of a wall 10 of the cell, during the vertical movement of the detection unit 20 inside the cell 2. The detection unit 20 comprises two sensitive probes 26, associated with each of the walls 10 of the cell which is being monitored.

Figure 5:
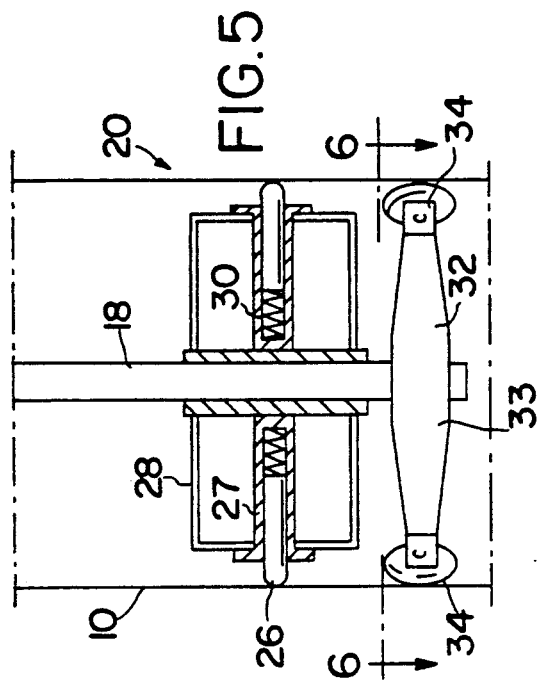
FIG. 5 is a larger-scale view of the lower end of the monitoring device shown in FIG. 4.
Figure 6:
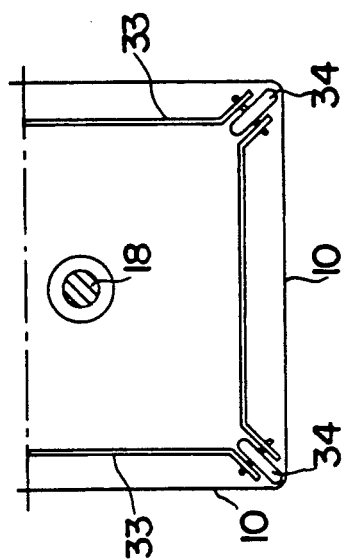
FIG. 6 is a half-view in section along line 6-6 of FIG. 5.

FIGS. 5 and 6 show that the sensitive probes 26 are mounted so as to slide in a transverse direction perpendicular to the axis of the rod 18, inside a carrier 27 mounted in a framework 28 integrally attached to the rod 18 of the device. The probes 26 are pushed outwards, i.e. in a direction opposite to the axis of the rod 18, by springs 30 which permit their ends to be held in contact with the inner surface of the wall 10 of the cell.

The lower end of the rod 18 is integrally attached to a guiding unit 32 in the shape of a trolley comprising a framework 33 and four wheels 34 bearing on the corners of the cell, at the junction of two walls 10. Perfect centering of the detector unit 20 inside the cell is thus maintained when this unit moves vertically.

The thickness probes 26, which are connected by means of cables 21 to the monitoring station 22, emit signals whose shape and amplitude depend on the thickness of the material forming the wall 10. These signals are recorded and displayed on the screen 23.

Figure 7:
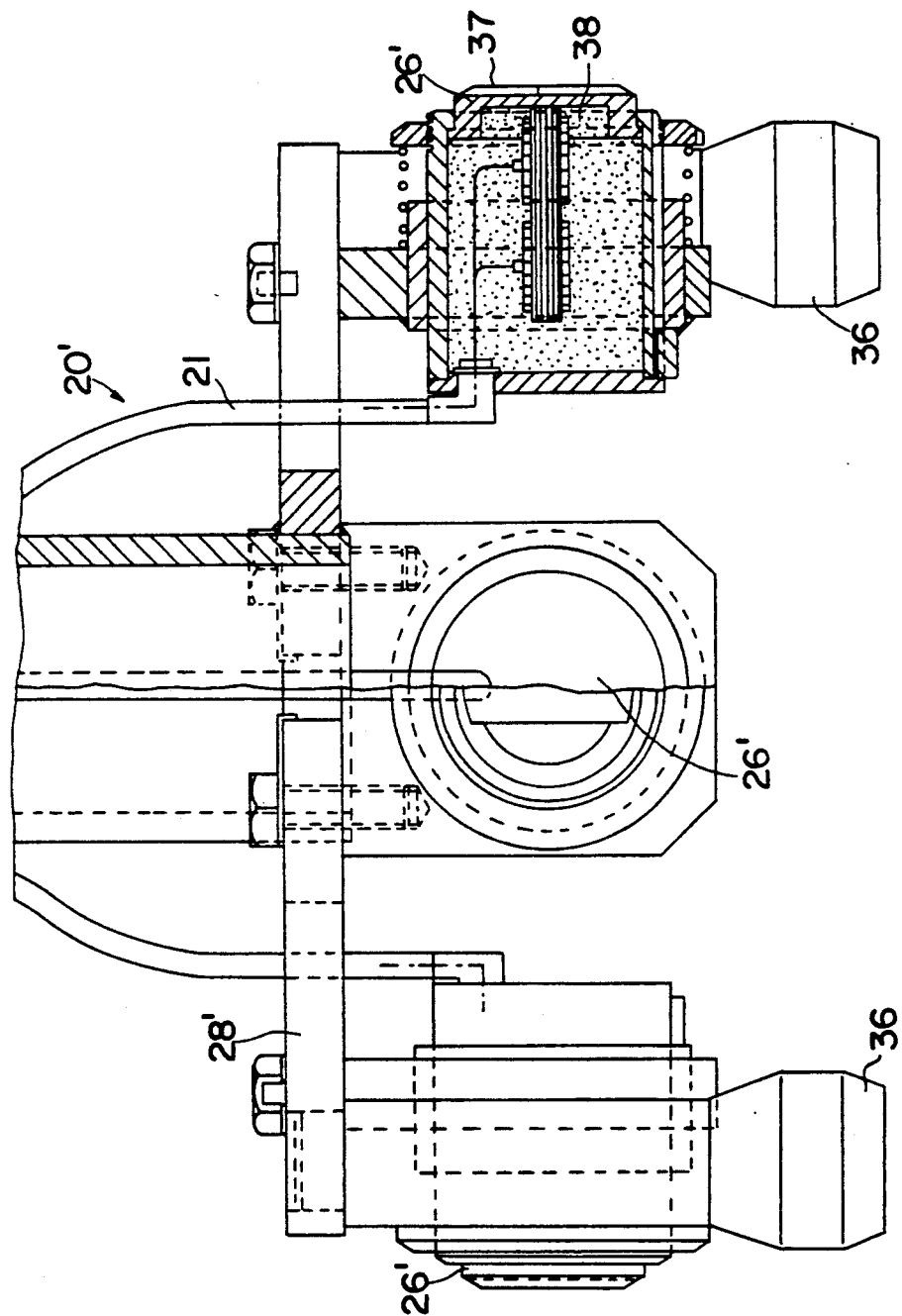
FIG. 7 is a partially sectioned elevation view of the lower end of a monitoring device according to a second embodiment of the invention.

Shown in FIG. 7 is a second embodiment of the detection unit 20' of a monitoring device according to the invention. The framework 28' of the unit 20' carries four Foucault current probes 26', which are arranged at 90° to one another. In working position inside a cell 2, the device 20' ensures its own centering and its own guidance, the outer end of each of the probes 26' coming into contact with the inner surface of one of the four walls of the cell.

The carrier 28' is also integrally attached to feet 36 which rest on the bottom of the cell when the device is in its low position, at the beginning or at the end of monitoring.

Each of the probes 26' comprises an outer bearing part 37 coming into contact with the wall of the cell, and a sensitive part 38 connected by cables 21 to the monitoring station 22.

Figure 8:
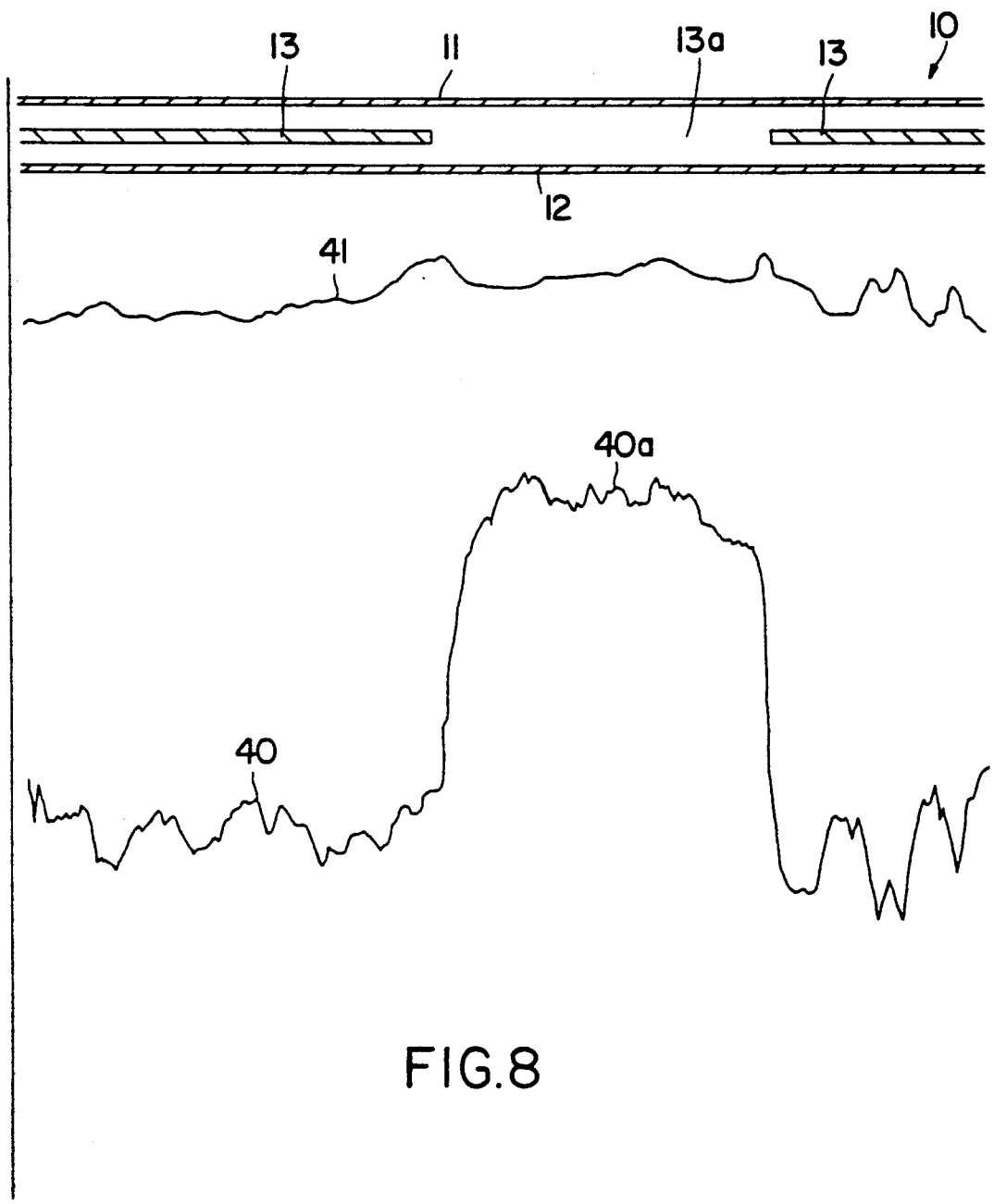
FIG. 8 is a diagram showing the recording obtained with a Foucault current probe device according to the invention, in the case of a cell wall comprising a discontinuity in its layer of absorbent material.

FIG. 8 shows schematically, in its upper part, the structure of a wall 10 of a cell on which monitoring according to the invention is being performed.

FIG. 8 also shows the signal 40 of a Foucault current probe during its movement along the lengthwise direction of the wall 10, and a corresponding reference signal 41 relating, for example, to the wall 10 of a new cell leaving manufacture.

The wall 10 comprises an inner enclosure 12 made of stainless steel, consisting of a metal strip with a thickness of 2 mm. The outer enclosure 11 also consists of a stainless steel strip, with a thickness of 0.8 mm.

A cadmium plate 13 0.5 millimeters in thickness is arranged between the enclosure 11 and the enclosure 12 and is interrupted in a region 13a of a certain length in the lengthwise direction of the wall 10.

As can be seen on the lower curve in FIG. 8, the signal 40 of a Foucault current probe moved in contact with or in the vicinity of the wall 10 undergoes a level change 40a corresponding to the region 13a, where the absorbent layer 13 of the wall 10 is interrupted. The reference signal 41 corresponds, for example, to the signal obtained in equivalent conditions on the wall 10 of the cell leaving manufacture. The signal 41 is at a substantially constant level.

The signal 41 can also correspond to the signal given by one of the probes of the detection unit 20 (or 20') arranged in the vicinity of one of the walls of the cell whose insulation layer 13 is not defective.

The reference signal for the wall 10 can be recorded on the new cell leaving manufacture, by using a movable device such as that which has been described, or stationary apparatus with a Foucault current thickness measuring probe in which the cell is moved.

When a wall 10 of a cell having a region where the neutron-absorbent layer is defective has been detected, an exchange of this cell and its replacement with a new cell are carried out.

The integrity of the cell walls can be verified systematically before irradiated assemblies are introduced into these cells. This monitoring can also be carried out in programmed fashion after a certain time of residence in the fuel storage pond.

The invention thus makes it possible to avoid keeping in the fuel storage pond cells whose walls have insufficient absorbent power with regard to the neutrons originating from the irradiated asssemblies.

The thickness probes may be ultrasonic probes instead of Foucault current probes.

The absorbent material of the cell walls may consist of a material other than cadmium, for example, of a boron compound or alloy, such as boron carbide.

The vertical travel of the measuring unit inside the cell may be produced by any means which is specifically designed or existing among the hardware associated with the fuel storage pond.

There may be any number of thickness probes in the detection unit, it being possible for one or more probes to be associated with each of the walls of the cell.

Any desired means for guiding the detection unit inside the cell can be used.

It is also possible to use monitoring devices comprising detection units which move in the vicinity or in contact with the outer surface of the cell walls. It is possible, for example, to use a detection unit having a setsquare-shaped framework carrying at least two probes capable of scanning the outer surface of the outward-facing walls of the cells situated in the corners of the storage rack.

The detection units may also have a thickness smaller than the width of the space arranged between the cells and capable of moving in the vertical direction within this space or of moving in a horizontal direction within this space when the racks do not comprise a full peripheral strap.

The devices permitting vertical movements of the probes may be combined with horizontal movements, either in translation in transverse directions or in rotation.

Lastly, the process and the device according to the invention are applicable to the underwater monitoring of the integrity of the walls of any storage cell for fuel assemblies comprising a neutron-absorbent layer.

I claim:

1. Process for monitoring a side wall of a storage cell for a fuel assembly immersed in a pond for underwater storage of fuel assemblies and comprising vertical side walls comprising metal sheets between which a layer of neutron-absorbent material is enclosed, said process comprising the steps of (a) moving at least one probe for monitoring a thickness of said layer of neutron-absorbent material, in a vertical direction, over an entire height of said immersed cell, adjacent a side wall which is being monitored;

(b) collecting readings of said probe from a region situated above a surface of said pond; and (c) comparing said readings with reference measurements relating to a reference wall of a cell, said reference wall being identical to the wall which is being monitored and containing a wholly continuous layer of neutron-absorbent material.

2. Process according to claim 1, wherein said probe is a Foucault current probe.

3. Process according to claim 1, wherein said probe is an ultrasonic probe.

4. Process according to any one of claims 1 to 3, wherein said reference measurements are made and recorded on the wall to be monitored when said wall is new, at the end of cell manufacture, and wherein said readings are compared to said reference measurements.

* * * * *